(12) United States Patent
Lee et al.

(10) Patent No.: US 10,534,194 B2
(45) Date of Patent: Jan. 14, 2020

(54) REFLECTING MODULE FOR OIS AND CAMERA MODULE INCLUDING THE SAME

(71) Applicant: Samsung Electro-Mechanics Co., Ltd., Suwon-si (KR)

(72) Inventors: Ta Kyoung Lee, Suwon-si (KR); Ah Hyeon Im, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 22 days.

(21) Appl. No.: 15/842,471

(22) Filed: Dec. 14, 2017

(65) Prior Publication Data
US 2018/0239162 A1 Aug. 23, 2018

(30) Foreign Application Priority Data

Feb. 17, 2017 (KR) .................. 10-2017-0021741
May 18, 2017 (KR) .................. 10-2017-0061821

(51) Int. Cl.
*H04N 5/232* (2006.01)
*G02B 27/64* (2006.01)

(52) U.S. Cl.
CPC ......... *G02B 27/646* (2013.01); *H04N 5/2328* (2013.01); *H04N 5/23258* (2013.01)

(58) Field of Classification Search
CPC ............. H04N 5/2254; H04N 5/2257; H04N 5/23248; H04N 5/23258; H04N 5/2328;
(Continued)

(56) References Cited

U.S. PATENT DOCUMENTS 9,020,334 B1 4/2015 Suzuka
2014/0009631 A1 1/2014 Topliss
(Continued)

FOREIGN PATENT DOCUMENTS

JP 3852073 B2 11/2006
JP 2015-11353 A 1/2015
(Continued)

OTHER PUBLICATIONS

Korean Office Action dated Aug. 30, 2018 in corresponding Korean Patent Application No. 10-2017-0061821 (5 pages in English and 4 pages in Korean).
(Continued)

*Primary Examiner* — Lin Ye
*Assistant Examiner* — Chriss S Yoder, III
(74) *Attorney, Agent, or Firm* — NSIP Law

(57) ABSTRACT

A reflecting module for optical image stabilization (OIS) includes: a housing including an internal space; a driving holder including a reflecting member and supported by an inner wall of the housing in a state in which a driving plate is fitted between the driving holder and the housing so that the driving holder is provided in the internal space; and a driving part configured to provide driving force to the driving holder to move the driving holder. The driving plate is linearly movable along one axis approximately perpendicular to an optical axis or is rotatable around the one axis with respect to the housing. The driving holder is linearly movable along the one axis or is rotatable around the one axis with respect to the driving plate.

18 Claims, 16 Drawing Sheets

(58) Field of Classification Search
CPC .............. H04N 5/23287; G02B 13/004; G02B 27/646; G03B 5/00; G03B 17/17; G03B 27/64; G03B 2205/0007; G03B 2205/0023
See application file for complete search history.

(56) References Cited

U.S. PATENT DOCUMENTS

2015/0002683 A1* 1/2015 Hu ..................... H04N 5/2328
348/208.2
2015/0042870 A1* 2/2015 Chan ................... G02B 13/009
348/357

FOREIGN PATENT DOCUMENTS

| KR | 10-2014-0014787 A | 2/2014 |
| KR | 10-2016-0042066 A | 4/2016 |
| WO | WO 2015/021279 A1 | 2/2015 |

OTHER PUBLICATIONS

Korean Office Action dated Jan. 31, 2018, in corresponding Korean Application No. 10-2017-0061821 (4 pages in English, 4 pages in Korean).

* cited by examiner

REFLECTING MODULE FOR OIS AND CAMERA MODULE INCLUDING THE SAME

CROSS-REFERENCE TO RELATED APPLICATIONS

This application claims the benefit under 35 U.S.C. § 119(a) of Korean Patent Application Nos. 10-2017-0021741 and 10-2017-0061821 filed on Feb. 17, 2017 and May 18, 2017, respectively, in the Korean Intellectual Property Office, the entire disclosures of which are incorporated herein by reference for all purposes.

BACKGROUND

1. Field

The following description relates to a reflecting module for optical image stabilization (OIS) and a camera module including the reflecting module.

2. Description of Related Art

Recently, camera modules have been standardly installed in portable electronic devices such as tablet personal computers (PCs) and laptop PCs, as well as in smartphones, and an autofocusing function, an optical image stabilization (OIS) function, and a zoom function have been implemented in camera modules for mobile terminals.

As the structures of camera modules including various functions have become relatively complicated, research into a technology for reducing the sizes of camera modules to be mounted in mobile terminals, which are continuously being miniaturized, has been continuously undertaken.

In addition, when a barrel and a holder including a lens is directly moved for the purpose of OIS, both a weight of the lens itself and weights of other members to which the lens is attached should be considered, and a certain level or more of driving force is thus required in order to move the barrel or the holder, resulting in increased power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reflecting module for optical image stabilization (01S) includes: a housing including an internal space; a driving holder including a reflecting member and supported by an inner wall of the housing in a state in which a driving plate is fitted between the driving holder and the housing so that the driving holder is provided in the internal space; and a driving part configured to provide driving force to the driving holder to move the driving holder. The driving plate is linearly movable along one axis approximately perpendicular to an optical axis or is rotatable around the one axis with respect to the housing. The driving holder is linearly movable along the one axis or is rotatable around the one axis with respect to the driving plate.

The driving plate may be configured to move together with the driving holder, in response to the driving plate being linearly moved along the one axis or rotated around the one axis. The driving holder may be configured to move relative to the driving plate, in response to the driving holder being linearly moved along the one axis or rotated around the one axis.

The driving plate may include one or more first ball bearing sets including first ball bearings aligned in one axial direction on a surface of the driving plate facing the housing, and a second ball bearing set including second ball bearings aligned in the one axial direction on another surface of the driving plate facing the driving holder.

The one or more first ball bearing sets may include two first ball bearing sets, and the first ball bearings may be aligned in the one axial direction between the driving plate and the housing when the driving plate is linearly moved with respect to the housing.

The second ball bearings may include two or more second ball bearings, and the two or more second ball bearings may be aligned in the one axial direction between the driving holder and the driving plate when the driving holder is rotated with respect to the driving plate.

The two or more second ball bearings may be positioned at approximately a center of the driving plate in another axial direction perpendicular to the optical axis and the one axis.

The first ball bearings may be fixed to the driving plate or the housing, or may be freely rotatable. The second ball bearings may be fixed to the driving plate or the driving holder, or may be freely rotatable.

The first and second ball bearings may have a spherical shape or a spherical shape of which a portion is cut.

The driving plate may include one or more ball bearings having a cylindrical or semi-cylindrical shape that is elongate along another axis perpendicular to the optical axis and the one axis between the driving plate and the housing when the driving plate is linearly moved with respect to the housing.

The driving holder may include one or more ball bearings having a cylindrical or semi-cylindrical shape that is elongate along the one axis between the driving holder and the driving plate when the driving holder is rotated with respect to the driving plate.

The reflecting module for OIS may further include: a pulling magnet disposed in one of the housing and the driving holder; and a pulling yoke disposed in the other of the housing and the driving holder, wherein the driving holder is supported by the inner wall of the housing by attractive force between the pulling magnet and the pulling yoke.

Any one of facing surfaces of the housing and the driving plate may include seating grooves into which the ball bearings are inserted.

The seating grooves may be elongate in a direction in which the ball bearings are aligned.

A cross section of the seating grooves may have a polygonal shape or a round shape.

In another general aspect, a camera module includes: a lens module including lenses; and a reflecting module for optical image stabilization (OIS) disposed in front of the lens module and configured to change a path of light incident to the reflecting module to direct the light toward the lens module. The reflecting module includes a housing including an internal space, a driving holder including a reflecting member and supported by an inner wall of the housing in a state in which a driving plate is fitted between the driving holder and the housing so that the driving holder is provided in the internal space, and a driving part configured to provide driving force to the driving holder to move the driving holder. The driving plate is linearly movable along one axis approximately perpendicular to an optical axis or is rotatable around the one axis with respect to the housing. The driving holder is linearly movable along the one axis or is rotatable around the one axis with respect to the driving plate.

The lens module may be disposed in the housing, and a main board on which coils for driving the lens module and the reflecting module for OIS are mounted is disposed on side surfaces and a bottom surface of the housing.

The main board may include a double-sided substrate. The coils may be mounted on an inner surface of the main board toward the internal space of the housing. Components and a gyro sensor may be mounted on an outer surface of the main board opposing the inner surface of the main board.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
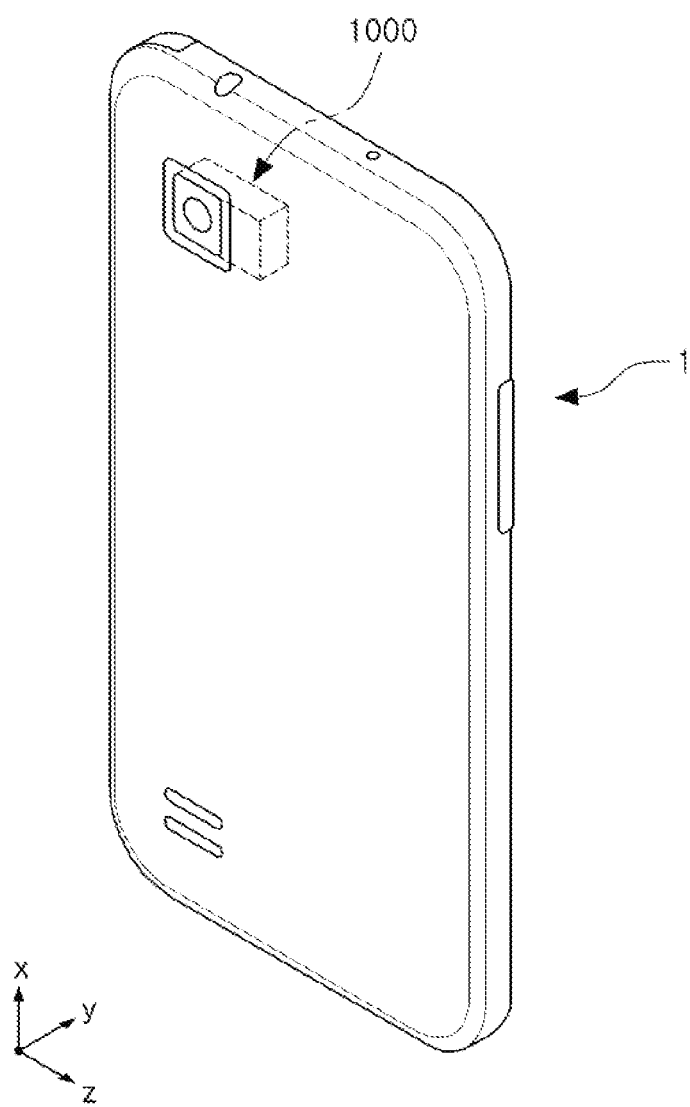
FIG. 1 is a perspective view illustrating a portable electronic device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," "coupled to," "over," or "covering" another element, it may be directly "on," "connected to," "coupled to," "over," or "covering" the other element, or there may be one or more other elements intervening therebetween. In contrast, when an element is described as being "directly on," "directly connected to," "directly coupled to," "directly over," or "directly covering" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, embodiments will be described in detail with reference to the accompanying drawings.

FIG. 1 is a perspective view illustrating a portable electronic device 1, according to an embodiment.

Referring to FIG. 1, the portable electronic device 1 may be a portable electronic device such as a mobile communications terminal, a smartphone, or a tablet personal computer (PC), in which a camera module 1000 is mounted.

As illustrated in FIG. 1, the portable electronic device 1 includes the camera module 1000 to capture an image of a subject.

The camera module 1000 includes lenses, and an optical axis (a Z axis) of each of the lenses is directed toward a direction perpendicular to a thickness direction (a Y-axis direction or a direction from a front surface of the portable electronic device to a rear surface thereof or an opposite direction to the direction from the front surface of the portable electronic device to the rear surface thereof) of the portable electronic device 1.

As an example, the optical axis (the Z axis) of each of the lenses included in the camera module 1000 may be formed in a width direction or a length direction (an X-axis direction or a Z-axial direction) of the portable electronic device 1.

Therefore, even in the case that the camera module 1000 has functions such as an autofocusing (AF) function, a zoom function, an optical image stabilization (hereinafter, referred to as OIS) function, a thickness of the portable electronic device 1 may not be increased. Therefore, the portable electronic device 1 may be miniaturized.

The camera module 1000 has any one or any combination of any two or more of the AF function, the zoom function, and the OIS function.

Since the camera module 1000 including the AF function, the zoom function, and the OIS function, needs to include various components, a size of the camera module may be increased in comparison to a general camera module.

When the size of the camera module 1000 is increased, it may be difficult to miniaturize the portable electronic device 1 in which the camera module 1000 is mounted.

For example, when the number of stacked lenses in the camera module is increased for the purpose of the zoom function and the stacked lenses are formed in the camera module in the thickness direction of the portable electronic device, a thickness of the portable electronic device may also be increased depending on the number of stacked lenses. Therefore, when the thickness of the portable electronic device is not increased, it may not be possible to provide a sufficient number of stacked lenses, such that zoom performance may be deteriorated.

In addition, an actuator moving a lens group in an optical axial direction or a direction perpendicular to the optical axis needs to be installed in order to implement the AF function and the OIS function, and when the optical axis (the Z axis) of the lens group is formed in the thickness direction of the portable electronic device, the actuator moving the lens group also needs to be installed in the thickness direction of the portable electronic device. Therefore, a thickness of the portable electronic device may be increased.

However, in the camera module 1000, the optical axis (the Z axis) of each of the lenses is disposed perpendicular to the thickness direction of the portable electronic device 1 (that is, the optical axis (the Z axis) of each of the lenses is disposed in a direction parallel to a wide surface of the portable electronic device 1). Therefore, even in the case in which the camera module 1000 having the AF function, the zoom function, and the OIS function is mounted in the portable electronic device 1, the portable electronic device 1 may be miniaturized.

Figure 2:
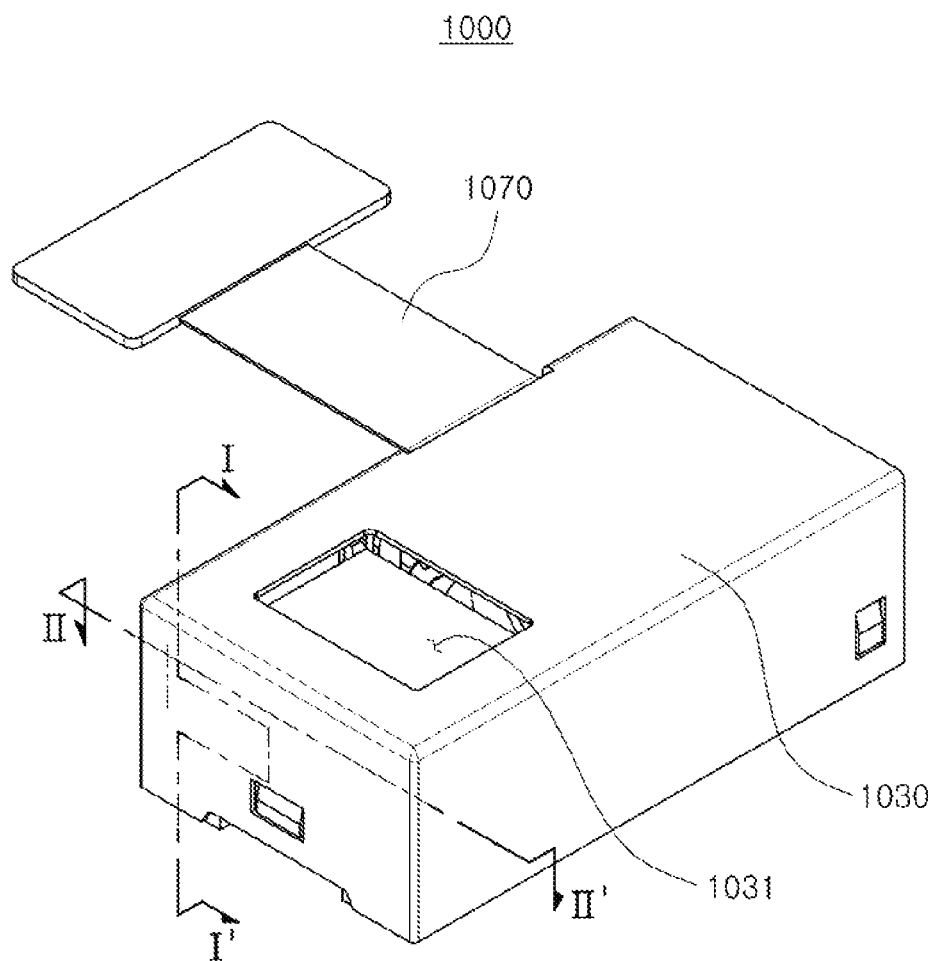
FIG. 2 is a perspective view illustrating a camera module, according to an embodiment.
Figure 3A:
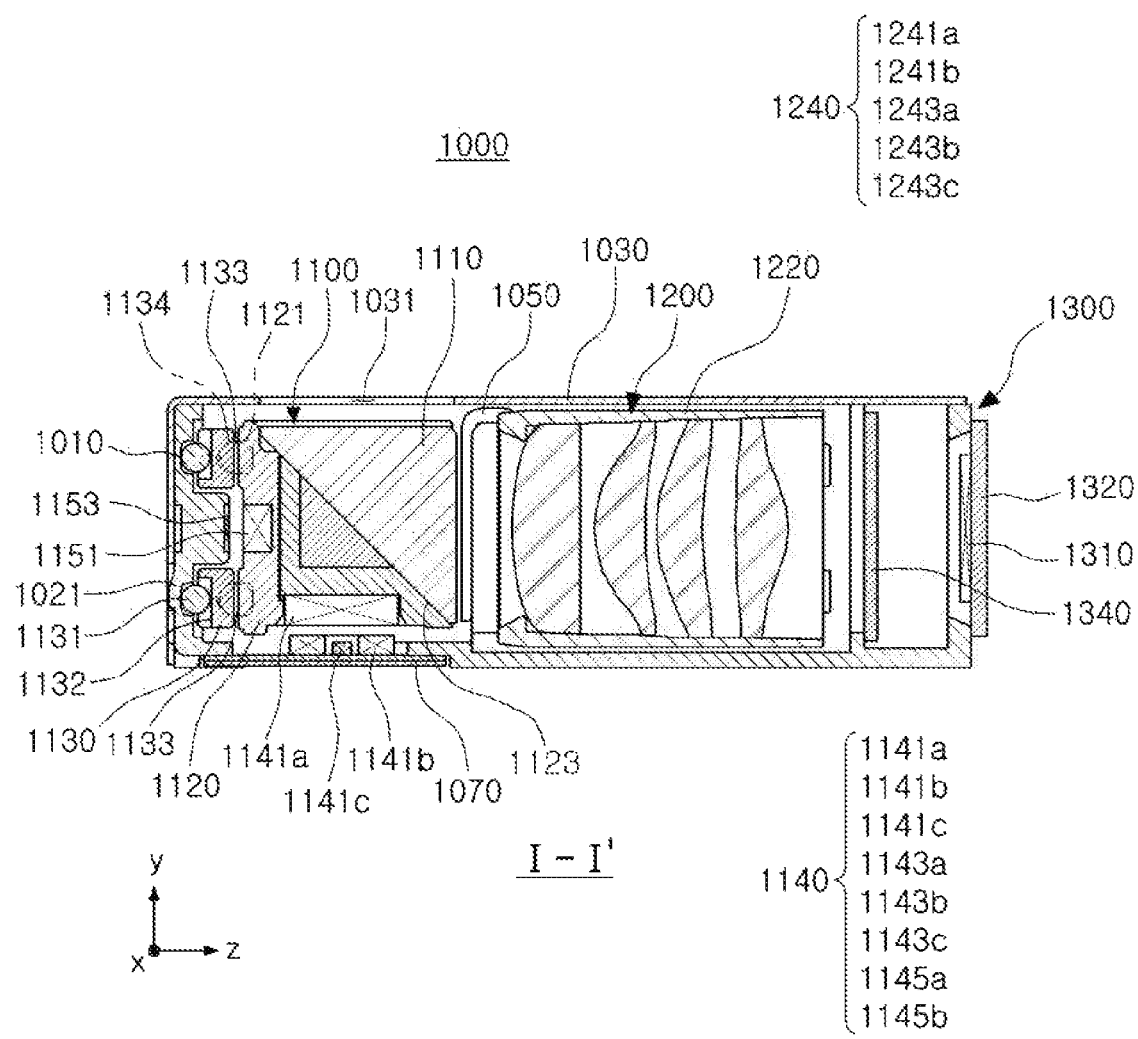
FIGS. 3A and 3B are cross-sectional views illustrating the camera module, according to an embodiment.
Figure 3B:
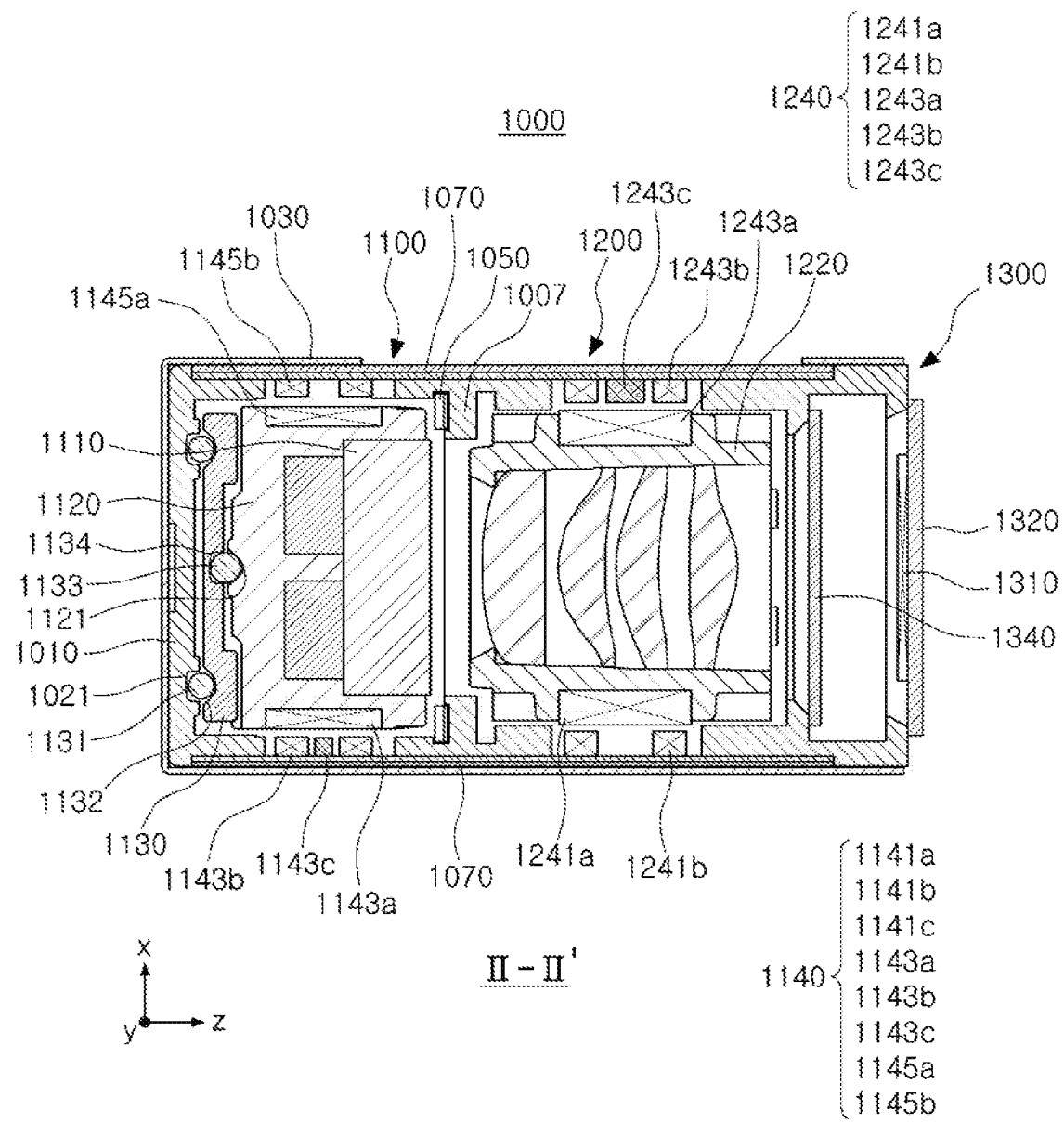

FIG. 2 is a perspective view illustrating the camera module 1000, according to an embodiment. FIGS. 3A and 3B are cross-sectional views illustrating the camera module 1000, according to an embodiment.

Referring to FIGS. 2 through 3B, a camera module 1000 includes a reflecting module 1100, a lens module 1200, and an image sensor module 1300 disposed in a housing 1010.

The reflecting module 1100 changes a moving direction of light. As an example, a moving direction of light incident through an opening 1031 (see FIG. 3A) of a cover 1030 covering an upper portion of the camera module 1000 is changed through the reflecting module 1100 so that the light is directed toward the lens module 1200. To this end, the reflecting module 1100 includes a reflecting member 1110 that reflects the light.

A path of the light incident through the opening 1031 is changed by the reflecting module 1100 so that the light is directed toward the lens module 1200. For example, a path of light incident in the thickness direction (the Y-axis direction) of the camera module 1000 is changed by the reflecting module 1100 to approximately coincide with the optical axial direction (the Z-axial direction).

The lens module 1200 includes lenses through which the light of which the moving direction is changed by the reflecting module 1100 passes, and the image sensor module 1300 includes an image sensor 1310 that converts the light passing through the lenses into an electrical signal and a printed circuit board 1320 on which the image sensor 1310 is mounted. In addition, the image sensor module 1300 includes an optical filter 1340 that filters the light incident thereto from the lens module 1200. The optical filter 1340 may be an infrared cut-off filter.

In an internal space of the housing 1010, the reflecting module 1100 is disposed in front of the lens module 1200 and the image sensor module 1300 is disposed behind the lens module 1200.

Thus, referring to FIGS. 2 through 10, the camera module 1000 includes the reflecting module 1100, the lens module 1200, and the image sensor module 1300 is disposed in the housing 1010.

The reflecting module 1100, the lens module 1200, and the image sensor module 1300 are sequentially provided from one side of the housing 1010 to the other side of the housing 1010. The housing 1010 includes the internal space into which the reflecting module 1100, the lens module 1200, and the image sensor module 1300 are inserted (the printed circuit board 1320 included in the image sensor module 1300 may be attached to an outer portion of the housing 1010). For example, as illustrated in the drawings, the housing 1010 is integrally formed so that both of the reflecting module 1100 and the lens module 1200 are inserted into the internal space of the housing 1010. However, the housing 1010 is not limited to such a configuration. For example, separate housings into which the reflecting module 1100 and the lens module 1200 are inserted, respectively, may also be connected to each other.

In addition, the housing 1010 is covered by the cover 1030 so that the internal space of the housing 1010 is not visible.

The cover 1030 includes the opening 1031 through which light is incident, and a moving direction of the light incident through the opening 1031 is changed by the reflecting module 1100, such that the light is incident to the lens module 1200. The cover 1030 may be integrally formed to cover the entire housing 1010, or may be formed by separate members each covering the reflecting module 1100 and the lens module 1200.

To this end, the reflecting module 1100 includes the reflecting member 1110 that reflects the light. In addition, the light incident to the lens module 1200 passes through the lenses and is then converted into and stored as the electrical signal by the image sensor 1310.

As described above, the housing 1010 includes the reflecting module 1100 and the lens module 1200 disposed in the internal space of the housing 1010. In the internal space of the housing 1010, a space in which the reflecting module 1100 is disposed and a space in which the lens module 1200 is disposed are distinguished from each other by protruding walls 1007. In addition, the reflecting module 1100 is disposed in front of the protruding walls 1007, and the lens module 1200 is disposed behind the protruding walls 1007. The protruding walls 1007 protrude from opposite sidewalls of the housing 1010 to the internal space (protrude in the X-axis direction).

In the reflecting module 1100, attractive force is formed between a pulling yoke 1153 provided on an inner wall surface of the housing 1010 and a pulling magnet 1151 provided on a driving holder 1120, and the driving holder 1120 may be closely adhered to and supported by the inner wall surface of the housing 1010 by the attractive force. Although not illustrated in the drawings, the housing 1010 may also be provided with a pulling magnet, and the driving holder 1120 may also be provided with a pulling yoke. However, a structure illustrated in the drawings will be described hereinafter for convenience of explanation.

In addition, first ball bearings 1131, a driving plate 1130, and second ball bearings 1133 are provided between the inner wall surface of the housing 1010 and the driving holder 1120. Since the first ball bearings 1131 and the second ball bearings 1133 are closely adhered to seating grooves 1132, 1134, 1021, and 1121 while being partially inserted into the seating grooves 1132, 1134, 1021, and 1121 as described below, when the driving holder 1120 and the driving plate 1130 are inserted into the internal space of the housing 1010, a slight space may be required between the driving holder 1120 and the protruding walls 1007, and after the driving holder 1120 is mounted in the housing 1010, the driving holder 1120 is closely adhered to the inner wall surface of the housing 1010 by the attractive force between the pulling yoke and the pulling magnet, and a slight space thus remains between the driving holder 1120 and the protruding walls 1007.

Therefore, the housing 1010 includes stoppers 1050 fitted onto the protruding walls 1007 while supporting the driving holder 1120, and having a hook shape. The stoppers 1050 support the driving holder 1120 in a state in which hook portions thereof are hooked onto the protruding walls 1007. Although it is described that the stoppers 1050 support the driving holder 1120, the driving holder 1120 needs to be substantially moved, such that a space is provided between the stoppers 1050 and the driving holder 1120. Alternatively, in addition, the stoppers 1050 may be formed of an elastic material to allow the driving holder 1120 to be smoothly moved in a state in which the driving holder 1120 is supported by the stoppers 1050.

The stoppers 1050 serve as brackets supporting the driving holder 1120 when the reflecting module 1100 is not driven, and additionally serve as the stoppers 1050 adjusting movement of the driving holder 1120 when the reflecting module 1100 is driven. The stoppers 1050 are provided, respectively, on the protruding walls 1007 protruding from the opposite sidewalls of the housing. Even in a case in which the stoppers 1050 are not provided, the driving holder 1120 may be fixed to the housing by the attractive force between the pulling magnet 1151 and the pulling yoke 1153.

In addition, the housing 1010 includes a first driving part 1140 and a second driving part 1240 each provided in order to drive the reflecting module 1100 and the lens module 1200. The first driving part 1140 includes coils 1141b, 1143b, and 1145b for driving the reflecting module 1100, and the second driving part 1240 includes coils 1241b and 1243b for driving the lens module 1200. In addition, since the coils 1141b, 1143b, 1145b, 1241b, and 1243b are provided on the housing 1010 in a state in which they are mounted on a main board 1070, the housing 1010 includes through-holes 1015, 1016, 1017, 1018, and 1019 so that the coils 1141b, 1143b, 1145b, 1241b, and 1243b are exposed to the internal space of the housing 1010.

The main board 1070 on which the coils 1141b, 1143b, 1145b, 1241b, and 1243b are mounted may be entirely connected and integrally provided, as illustrated in the drawings. In this case, one terminal may be provided, and connection of an external power supply and signals may therefore be easy. However, the main board 1070 is not limited to such a configuration, and may also be provided as multiple boards by separating a board on which coils for the reflecting module 1100 are mounted and a board on which coils for the lens module 1200 are mounted from each other.

The reflecting module 1100 changes the path of the light incident thereto through the opening 1031. When an image or a moving image is captured, the image may be blurred or the moving image may be shaken due to a hand-shake, or other shaking, of a user. In this case, the reflecting module 1100 corrects the hand-shake, or the other shaking, of the user by moving the driving holder 1120 on which the reflecting member 1110 is mounted. For example, when shaking is generated at the time of capturing the image or the moving image due to the hand-shake, or the other shaking, of the user, a relative displacement corresponding to shaking is provided to the driving holder 1120 to compensate for shaking.

In addition, the OIS function is implemented by the movement of the driving holder 1120 having a relatively low weight since it does not include lenses, and the like, and power consumption may thus be significantly reduced.

That is, the light on which the OIS is performed is directed to be incident to the lens module 1200 by changing the moving direction of the light by the movement of the driving holder 1120 on which the reflecting member 1110 is provided, without moving the lens barrel including the lenses or the image sensor in order to implement the OIS function.

The reflecting module 1100 includes the driving holder 1120 disposed in the housing 1010 and supported by the housing 1010, the reflecting member 1110 mounted on the driving holder 1120, and the first driving part 1140 that provides driving force to the driving holder 1120.

The reflecting member 1110 changes the moving direction of the light. For example, the reflecting member 1110 is a mirror or a prism reflecting the light (a case in which the reflecting member 1110 is a prism is illustrated in the drawings for convenience of explanation).

The reflecting member 1110 is fixed to the driving holder 1120. The driving holder 1120 has a mounting surface 1123 (FIG. 3A) on which the reflecting member 1110 is mounted.

The mounting surface 1123 of the driving holder 1120 is an inclined surface so that the path of the light is changed. For example, the mounting surface 1123 is an inclined surface that is inclined with respect to the optical axis (the Z axis) of each of the lenses by 30° to 60°. In addition, the inclined surface of the driving holder 1120 is directed toward the opening 1031 of the cover 1030 through which the light is incident.

The driving holder 1120 on which the reflecting member 1110 is mounted is movably accommodated in the internal space of the housing 1010. For example, the driving holder 1120 is linearly movable along any one of a first axis (an X axis) and a second axis (a Y axis), and is rotatable around an axis parallel with a direction in which it is linearly movable, within the housing 1010. For example, the driving holder 1120 may be linearly movable along the first axis (the X axis) and may be rotatable around the first axis (the X axis. Alternatively, the driving holder 1120 may be linearly movable along the second axis (the Y axis) and may be rotatable around the second axis (the Y axis). For convenience, an embodiment in which the driving holder 1120 is linearly movable along the second axis (the Y axis) and is rotatable around the second axis (the Y axis), as illustrated in the drawings, will hereinafter be described.

The first axis (the X axis) and the second axis (the Y axis) are axes perpendicular to the optical axis (the Z axis), and may be perpendicular to each other.

The driving holder 1120 is supported by the housing 1010 by the first ball bearings 1131 and the second ball bearings 1133 provided on a front surface and a rear surface of the driving plate 1130, respectively, and aligned along the second axis (the Y axis), respectively, so that the driving holder 1120 is smoothly linearly moved along the second axis (the Y axis) and is smoothly rotated around the second axis (the Y axis). That is, as illustrated in the drawings, the first ball bearings 1131 guide the linear movement along the second axis (the Y axis), and the second ball bearings 1133 guide the rotation around the second axis (the Y axis).

In the drawings (see FIG. 4, for example), two sets 1131a and 1131b of first ball bearings 1131 aligned along the second axis (the Y axis) and configured in pairs and two second ball bearings 1133 aligned along the second axis (the Y axis) are illustrated by way of example. Since the driving plate 1130 is moved along the second axis (the Y axis) in a state in which it is supported by the housing 1010, at least two sets 1131a and 1131b of first ball bearings 1131 are disposed in parallel with a second axial direction (the Y-axis direction) and are spaced apart from each other in a first axial direction (the X-axis direction) in order to stably move the driving plate 1130. In this case, any one of the two sets 1131a and 1131b may also include only one first ball bearing 1131.

Figure 6A:
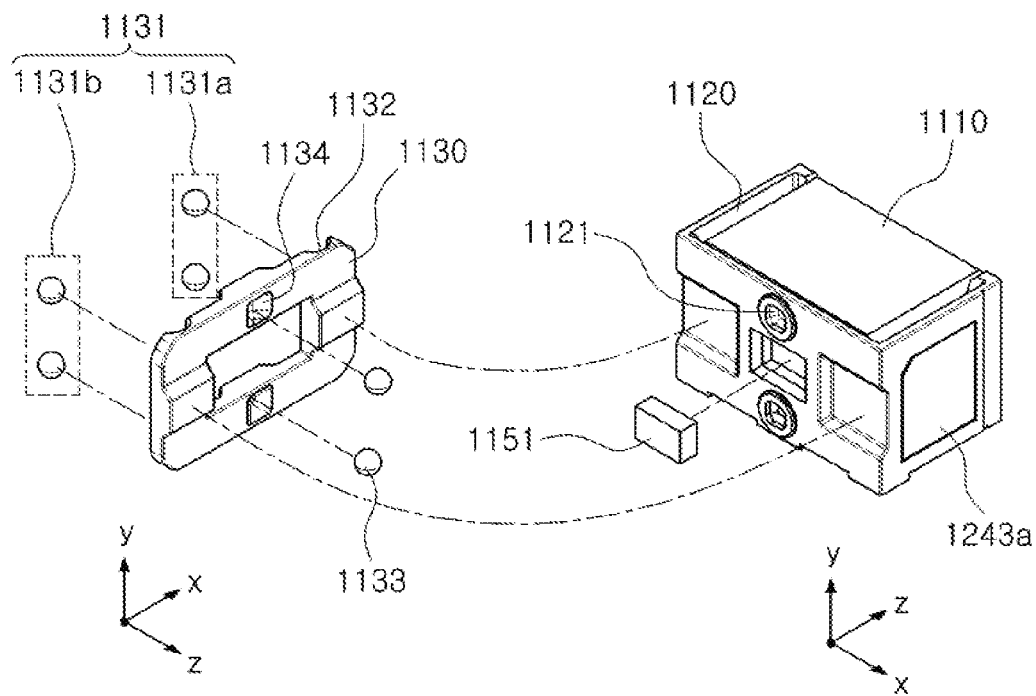
FIGS. 6A and 6B are exploded perspective views illustrating a driving plate and a driving holder of the camera module, according to an embodiment.
Figure 6B:
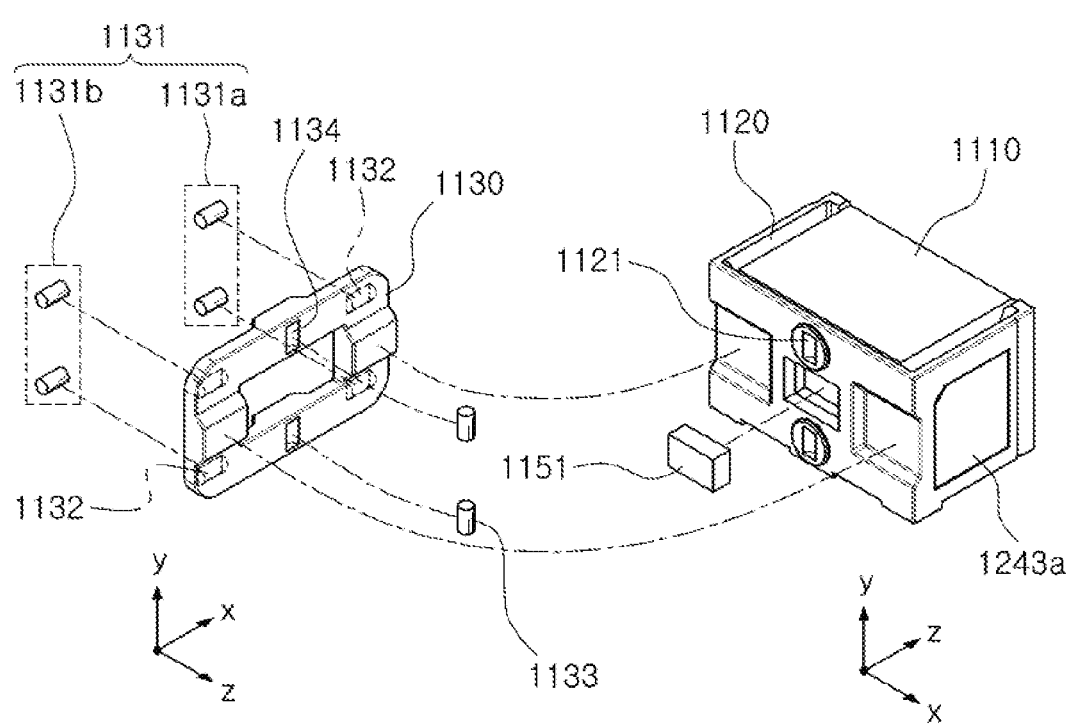
Figure 7:
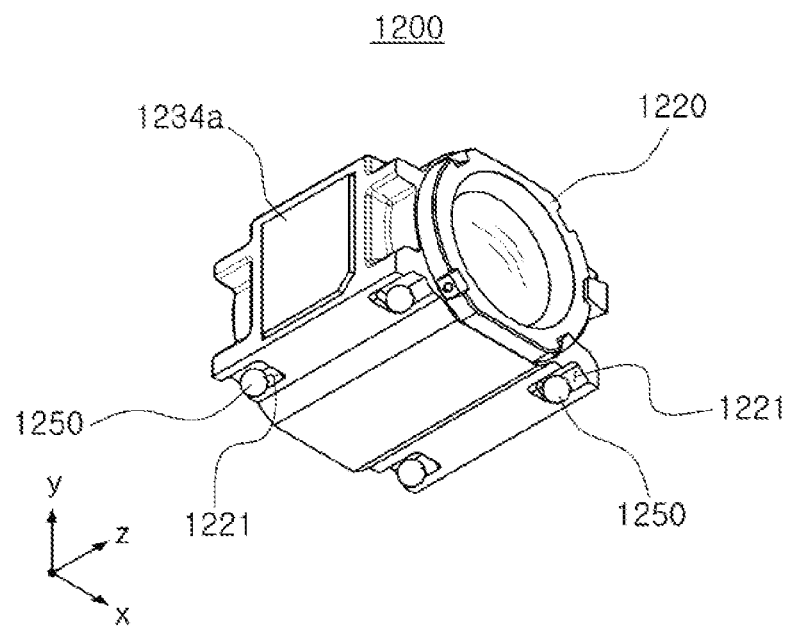
FIG. 7 is a perspective view illustrating a lens holder of the camera module, according to an embodiment.
Figure 8:
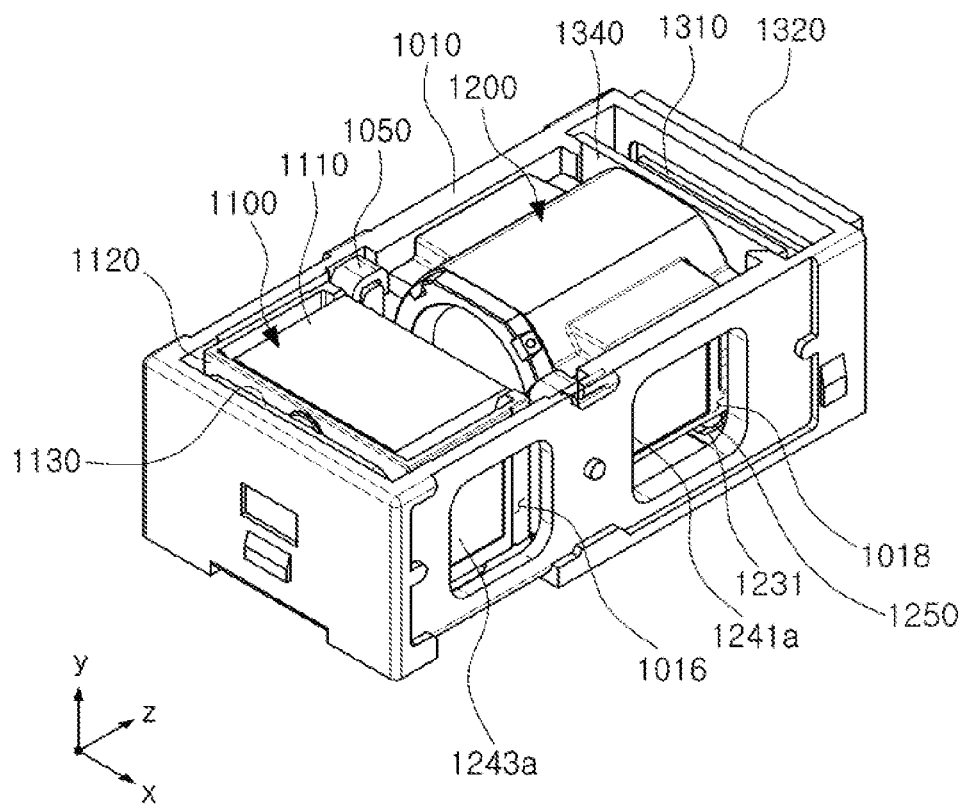
FIG. 8 is an assembled perspective view illustrating components other than a cover in the camera module, according to an embodiment.
Figure 9:
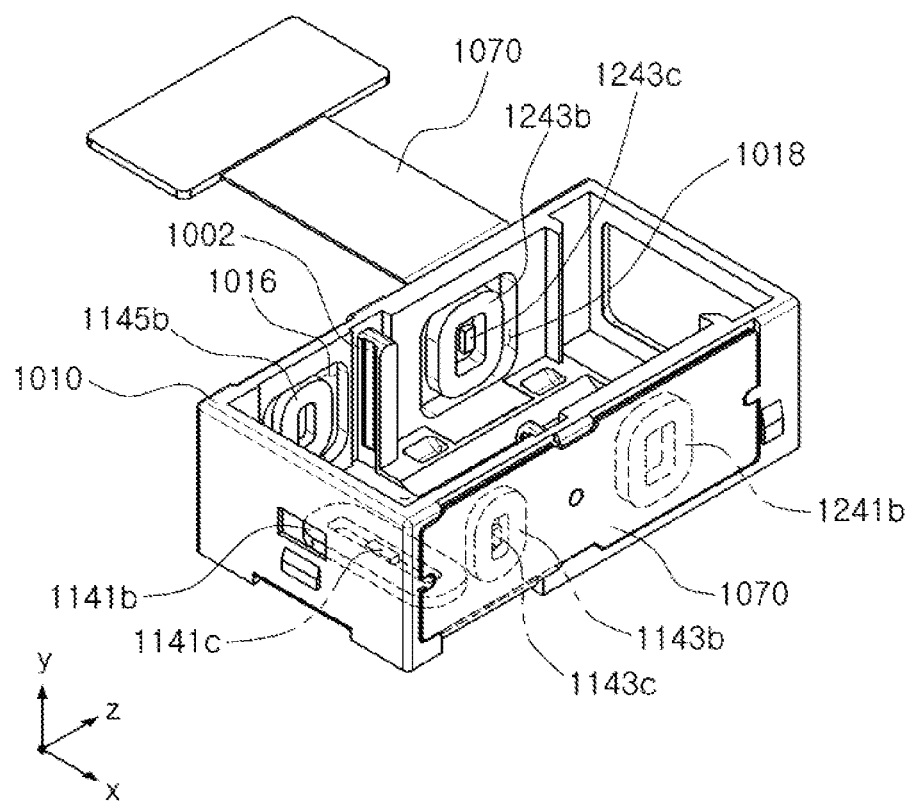
FIG. 9 is an assembled perspective view illustrating the housing and a board in the camera module, according to an embodiment.
Figure 10:
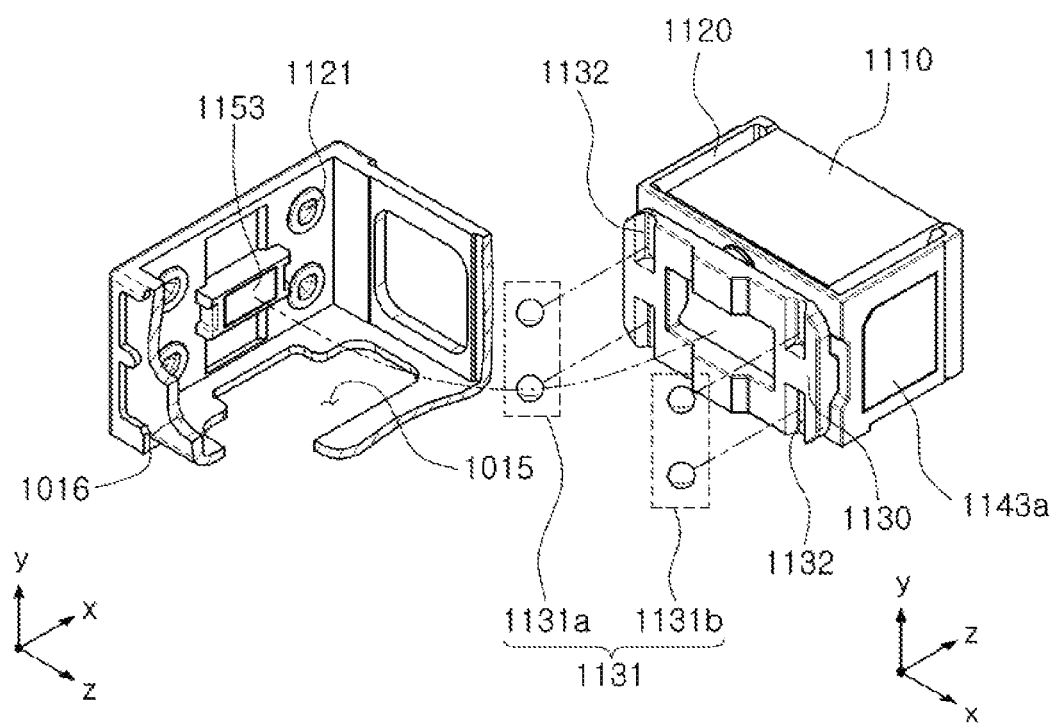
FIG. 10 is an exploded perspective view illustrating the housing and the driving holder in the camera module, according to an embodiment.

The driving holder 1120 is linearly movable along the second axis (the Y axis) and is rotatable around the second axis (the Y axis), and the first ball bearings 1131 or the second ball bearings 1133 are formed in a cylindrical shape and are disposed such that the cylindrical shape is extended along the second axis (the Y axis). In this case, the seating grooves 1132, 1134, 1021, and 1121 are also formed in a semi-cylindrical shape corresponding to shapes of the first and second ball bearings (see FIG. 6B). The two sets of first ball bearings 1131 aligned in pairs in the second axial direction (the Y axial direction) are illustrated in FIG. 6B, but the first ball bearings 1131 may also be provided as two pillar-shaped (cylindrical or semi-cylindrical) bearings extended to be elongate in the first axial direction (the X-axis direction) by integrating the two sets of first ball bearings 1131 with each other. In addition, an embodiment in which the two second ball bearings 1133 are provided is illustrated, but one second ball bearing 1133 that is extended to be elongate in the second axial direction (the Y-axis direction) may also be provided.

In addition, the first ball bearings 1131 and the second ball bearings 1133 are disposed on the front surface and the rear surface of the driving plate 1130, respectively, and the driving plates 1130 are disposed between the driving holder 1120 and an inner surface of the housing 1010. In addition, the driving holder 1120 is supported by the housing 1010 through the driving plate 1130 (the first ball bearings 1131 and the second ball bearings 1133 are also disposed between the driving holder 1120 and the housing 1010) by the attractive force between the pulling magnet 1151 or the pulling yoke provided on the driving holder 1120 and the pulling yoke 1153 or the pulling magnet 1151 provided on the housing 1010.

Contrary to the example illustrated in the drawings, the first ball bearings 1131 may guide the rotation around the second axis (the Y axis), and the second ball bearings 1133 may guide the linear movement in relation to the second axis (the Y axis). In this case, disposition shapes of the first ball bearings 1131 and the second ball bearings 1133 and shapes of seating grooves 1132, 1134, 1021, and 1121 in which the first ball bearings 1131 and the second ball bearings 1133 are disposed may also be exchanged with each other.

The seating grooves 1132 and 1134 into which the first ball bearings 1131 and the second ball bearings 1133 are respectively inserted, are provided in the front surface and the rear surface of the driving plate 1130, respectively, and include first seating grooves 1132 into which the first ball bearings 1131 are partially inserted and second seating grooves 1134 into which the second ball bearings 1133 are partially inserted.

In addition, the housing 1010 includes third seating grooves 1021 into which the first ball bearings 1131 are partially inserted, and the driving holder 1120 may be provided with fourth seating grooves 1121 into which the second ball bearings 1133 are partially inserted.

The first ball bearings 1131 are inserted into the first seating grooves 1132 and the third seating groove 1021, and are provided between the driving plate 1130 and the housing 1010. In addition, the first ball bearings 1131 need to be able to be rolled or slid because the first ball bearings 1131 serve to guide the movement of the driving plate 1130 in the second axial direction (the Y-axis direction). Therefore, at least one of the first seating grooves 1132 and the third seating grooves 1021 is provided in a groove shape that is elongate in the second axial direction (the Y-axis direction).

In addition, when the driving holder 1120 is rotated around the second axis (the Y axis), the first ball bearings 1131 inserted into the first seating grooves 1132 and the third seating grooves 1021 are not moved, but need to be fixed. Therefore, at least one pair of first seating grooves 1131 and third seating grooves 1021 facing each other has a shape (for example, cross sections of the seating grooves may have a "V" shape, a "U" shape, a round shape, or a polygonal shape) of which a width of a cross section becomes smaller as a depth becomes greater.

In addition, the second ball bearings 1133 may be inserted into the second seating grooves 1134 and the fourth seating groove 1121, and may be disposed between the driving plate 1133 and the driving holder 1120. In addition, the second seating grooves 1134 and the fourth seating groove 1121 may be formed in a round (e.g., hemispherical) groove shape or a polygonal (poly-prismatic or poly-pyramidal) groove shape so that second ball bearings 1133 easily rotate to guide the rotation of the driving holder 1120 around the second axis (the Y axis).

In addition, depths of the seating grooves are smaller than radii of the seating grooves for the purpose of easiness of the movement or the rotation of the first ball bearings 1131 and the second ball bearings 1133. The first ball bearings 1131 and the second ball bearings 1133 are not entirely inserted in the seating grooves, but are partially exposed, such that the driving plate 1130 is easily moved and the driving holder 1120 is easily rotated.

In addition, positions and the numbers of first seating grooves 1132, second seating grooves 1134, third seating grooves 1021, and fourth seating grooves 1121 may correspond to those of sets of first ball bearings 1131 aligned along the second axis (the Y axis) and second ball bearings 1133 aligned along the second axis (the Y axis).

Here, the first ball bearings 1131 and the second ball bearings 1133 function as bearings while being rolled or slid in the first seating grooves 1132, the second seating grooves 1134, the third seating grooves 1021, and the fourth seating grooves 1121.

The first ball bearings 1131 and the second ball bearings 1133 may have a structure in which they are fixedly disposed in at least one of the housing 1010, the driving plate 1130, and the driving holder 1120. In an example, the first ball bearings 1131 are fixedly disposed in the housing 1010 or the driving plate 1130, and the second ball bearings 1133 are fixedly disposed in the driving plate 1130 or the driving holder 1120. In this case, only a member facing a member in which the first ball bearings 1131 or the second ball bearings 1133 are fixedly provided is provided with the seating grooves. In this case, the ball bearings function as friction bearings by sliding rather than rotating.

In an embodiment in which the first ball bearings 1131 and the second ball bearings 1133 are fixedly provided in any one of the housing 1010, the driving plate 1130, and the driving holder 1120, the first ball bearings 1131 and the second ball bearings 1133 may be formed in a spherical shape or a hemispherical shape (a case in which the first ball bearings 1131 and the second ball bearings 1133 are provided in the hemispherical shape is only an example, and the first ball bearings 1131 and the second ball bearings 1133 may also be provided to have a protruding length greater or smaller than that of a hemisphere). As described above, a case in which each of the first ball bearings 1131 and the second ball bearings 1133 is formed in the cylindrical shape and disposed such that the cylindrical shape is extended along the second axis (the Y axis) may also be similarly applied.

In addition, the first ball bearings 1131 and the second ball bearings 1133 may be separately manufactured and be then provided in or attached to any one of the housing 1010, the driving plate 1130, and the driving holder 1120. Alternatively, the first ball bearings 1131 and the second ball bearings 1133 may be formed integrally with the housing 1010, the driving plate 1130, or the driving holder 1120 at the time of manufacturing the housing 1010, the driving plate 1130, or the driving holder 1120.

The first driving part 1140 generates driving force to move the driving holder 1120 along the second axis (the Y axis) or to rotate the driving holder 1120 around the second axis (the Y axis).

As an example, as illustrated in the drawings, the first driving part 1140 includes magnets 1141a, 1143a, and 1145a and the coils 1141b, 1143b, and 1145b disposed to face the magnets 1141a, 1143a, and 1145a. However, the magnets and the coils are not limited to such a configuration. That is, driving coils may be disposed in various manners using four surfaces including three surfaces of the housing 1010 on which the coils 1141b, 1143b, and 1145b are provided and a surface of the housing 1010 on which the pulling yoke 1153 is provided, and a disposition of the magnets may also be changed accordingly.

When power is applied to the coils 1141b, 1143b, and 1145b, the driving holder 1120 on which the magnets 1141a, 1143a, and 1145a are mounted is moved in the second axial direction (the Y-axis direction) or is rotated around the second axis (the Y axis) by electromagnetic interaction between the magnets 1141a, 1143a, and 1145a and the coils 1141b, 1143b, and 1145b.

The magnets 1141a, 1143a, and 1145a are mounted on the driving holder 1120. As an example, some 1141a of the magnets 1141a, 1143a, and 1145a are mounted on a lower surface of the driving holder 1120, and the others 1143a and 1145a of the magnets 1141a, 1143a, and 1145a are mounted on side surfaces of the driving holder 1120.

The coils 1141b, 1143b, and 1145b are mounted on the housing 1010. As an example, the coils 1141b, 1143b, and 1145b are mounted on the housing 1010 through the main board 1070. That is, the coils 1141b, 1143b, and 1145b are provided on the main board 1070, and the main board 1070 is mounted on the housing 1010. An example in which the main board 1070 is entirely integrally provided so that both of the coils 1141b, 1143b, and 1145b for the reflecting module 1100 and the coils 1241b and 1243b for the lens module 1200 are mounted thereon is illustrated in the drawings, but the main board 1070 may be provided as two or more separate boards on which the coils 1141b, 1143b, and 1145b for the reflecting module 1100 and the coils 1241b and 1243b for the lens module 1200 are mounted, respectively.

A reinforcing plate (not illustrated) may be mounted below the main board 1070 in order to reinforce strength of the main board.

When the driving holder 1120 is rotated, a closed loop control manner of sensing and feeding back a position of the driving holder 1120 is used. Therefore, position sensors 1141c and 1143c are provided in order to perform a closed loop control. The position sensors 1141c and 1143c may be hall sensors.

The position sensors 1141c and 1143c are disposed inside or outside the coils 1141b and 1143b, respectively, and are mounted on the main board 1070 on which the coils 1141b and 1143b are mounted.

The main board 1070 may include a gyro sensor (not illustrated) sensing shaking factor such as the hand-shake, or the like, of the user, and may be provided with a driver integrated circuit (IC) (not illustrated) providing driving signals to the coils 1141b, 1143b, and 1145b.

Figure 11A:
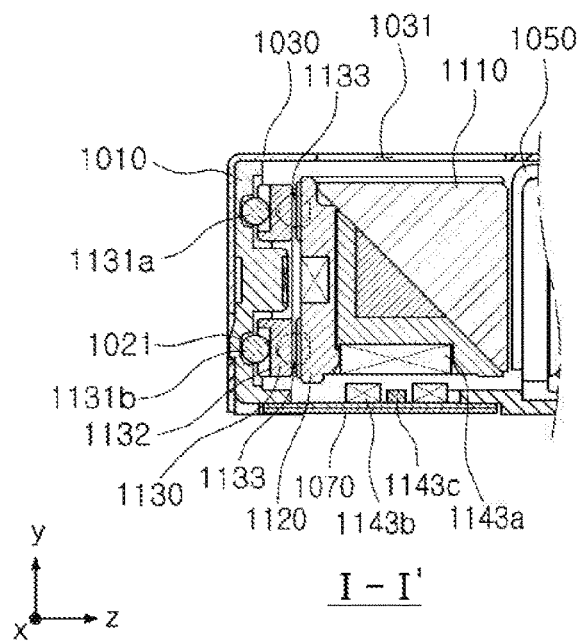
FIGS. 11A through 11C are schematic views illustrating an example of a manner in which the driving holder is linearly moved along a second axis.
Figure 11B:
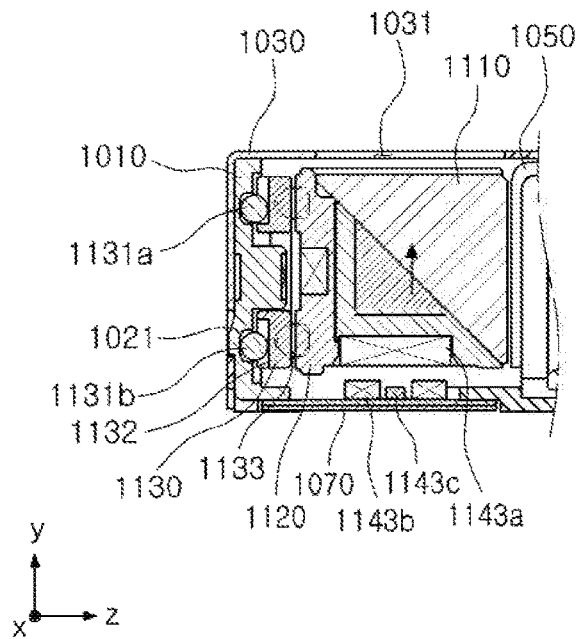
Figure 11C:
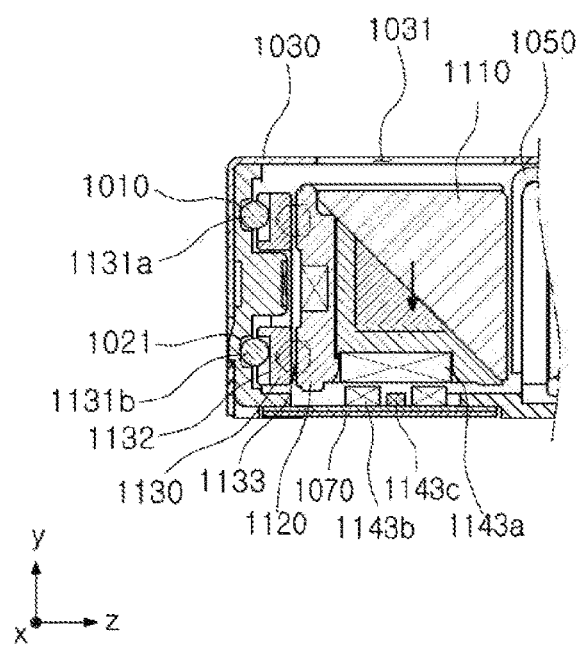
Figure 12A:
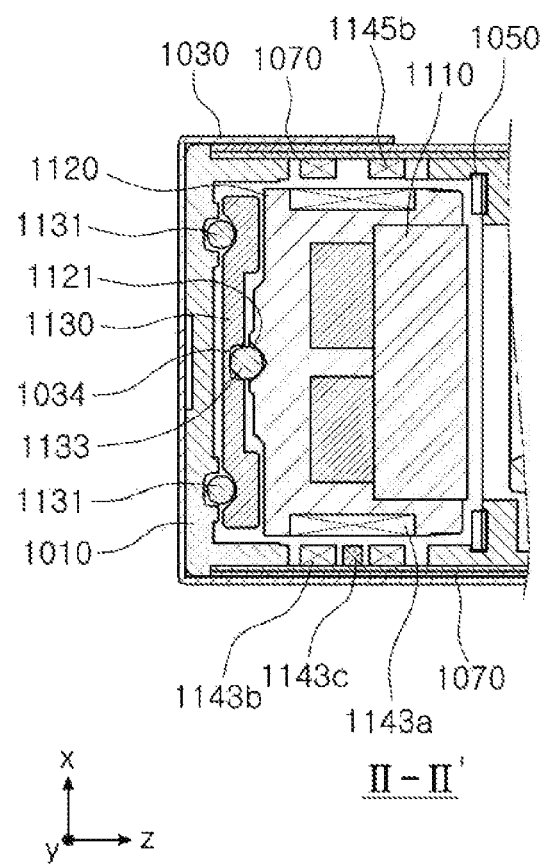
FIGS. 12A through 12C are schematic views illustrating an example of a manner in which the driving holder is rotated around a second axis.
Figure 12B:
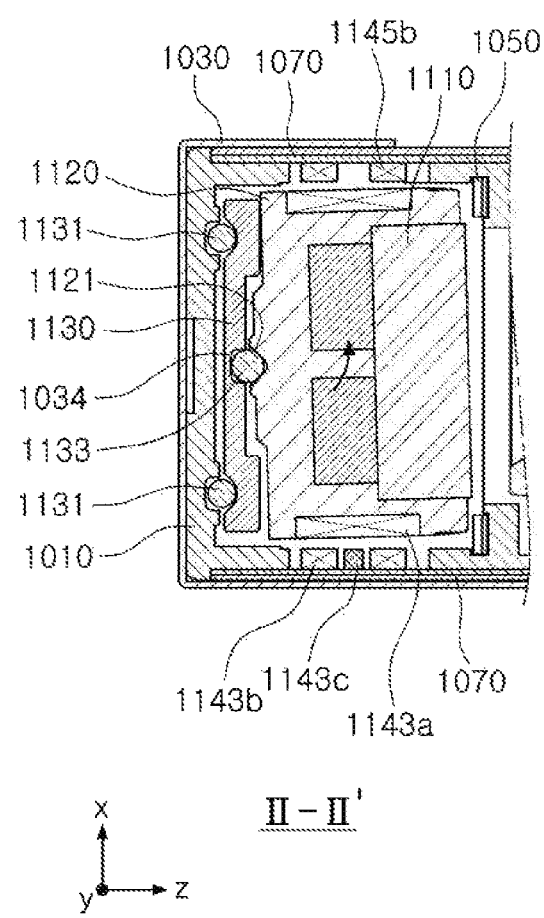
Figure 12C:
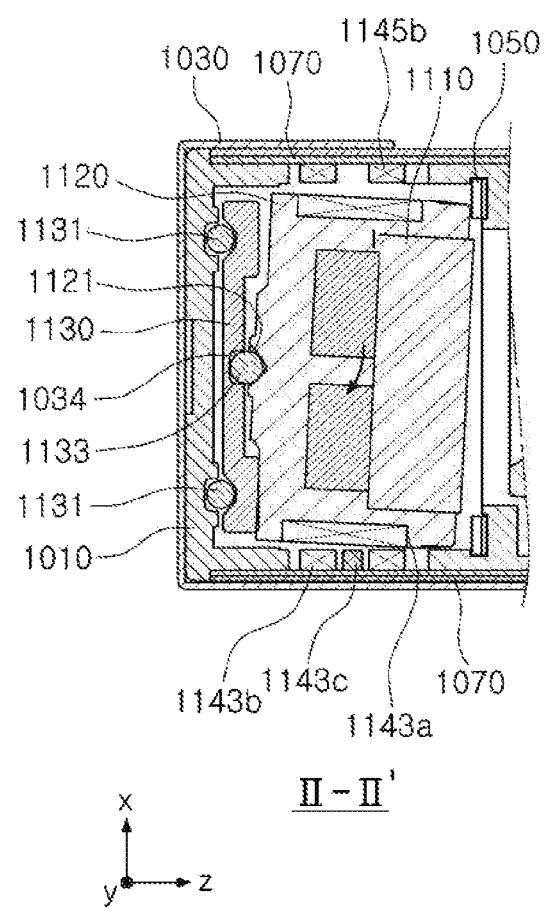

FIGS. 11A through 11C are schematic views illustrating a manner in which the driving holder 1120, according to an embodiment, is linearly moved along a second axis. FIGS. 12A through 12C are schematic views illustrating a manner in which the driving holder 1120, according to an, is rotated around a second axis.

Referring to FIGS. 11A through 11C, when the driving holder 1120 is linearly moved along the second axis (the Y axis), the driving holder 1120 is linearly moved along the second axis (the Y axis) in response to linear movement of the driving plate 1130 based on at least two sets of first ball bearings 1131 arranged along the second axis (the Y axis) (in this case, the driving holder 1120 is not moved relative to the driving plate 1130). In addition, referring to FIGS. 12A through 12C, when the driving holder 1120 is rotated around the second axis (the Y axis), the driving holder 1120 is rotated around the second ball bearings 1133 arranged along the second axis (the Y axis) (in this case, the driving plate 1130 is not rotated, and the driving holder 1120 is thus moved relative to the driving plate 1130).

That is, when the driving holder 1120 is linearly moved along the second axis (the Y axis), the first ball bearings 1131 function, and when the driving holder 1120 is rotated around the second axis (the Y axis), the second ball bearings 1133 function. The reason is that the second ball bearings 1133 aligned along the second axis (the Y axis) are not moved in a state in which they are fitted into the seating grooves when the driving holder 1120 is linearly moved along the second axis (the Y axis), and at least two sets of first ball bearings 1131 aligned along the second axis (the Y axis) are spaced apart from each other in the first axial direction (the X-axis direction) and relative movement between the driving holder 1120 and the driving plate 1130 is thus not generated in a state in which the driving holder 1120 is supported by the driving plate 1130 when the driving holder 1120 is rotated around the second axis (the Y axis), as illustrated in the drawings.

The light of which the path is changed by the reflecting module 1100 is incident to the lens module 1200. Therefore, optical axes of the stacked lenses included in the lens module 1200 are aligned in the Z-axial direction, a direction in which the light is emitted from the reflecting module 1100. In addition, the lens module 1200 includes the second driving part 1240 in order to implement the AF function or the zoom function. In addition, the lens module 1200 has a relatively low weight, since it does not include another component for OIS, may be moved in the optical axial direction in order to implement the AF function and the zoom function, and power consumption may thus be significantly reduced.

The lens module 1200 includes a lens holder 1220 disposed in the internal space of the housing 1010, and including lenses stacked therein, and the second driving part 1240 configured to move the lens holder 1220.

Lenses configured to capture an image of a subject may be accommodated in the lens holder 1220, and may be mounted along optical axes in the lens holder 1220.

The light of which the moving direction is changed by the reflecting module 1100 is refracted while passing through the lenses. The optical axis (the Z axis) of each of the lenses is perpendicular to the thickness direction (the Y-axis direction) of the lens module 1200.

The lens holder 1220 is moved in the optical axial direction (the Z-axial direction) for the purpose of AF. As an example, the lens holder 1220 is configured to be movable in a direction (including an opposite direction to the direction) in which the light of which the moving direction is changed by the reflecting module 1100 passes through the lenses.

The second driving part 1240 generates driving force to move the lens holder 1220 in the optical axial direction (the Z-axial direction). That is, the second driving part 1240 moves the lens holder 1220 to change a distance between the lens holder 1220 and the reflecting module 1100.

As an example, the second driving part 1240 includes magnets 1241a and 1243a and the coils 1241b and 1243b disposed to face the magnets 1241a and 1243a.

When power is applied to the coils 1241b and 1243b, the lens holder 1220 on which the magnets 1241a and 1243a are mounted is moved in the optical axial direction (the Z-axial direction) by electromagnetic interaction between the magnets 1241a and 1243a and the coils 1241b and 1243b.

The magnets 1241a and 1243a are mounted on the lens holder 1220. As an example, the magnets 1241a and 1243a are mounted on side surfaces of the lens holder 1220.

The coils 1241b and 1243b are mounted on the housing 1010. As an example, the main board 1070 is mounted on the housing 1010 in a state in which the coils 1241b and 1243b are mounted on the main board 1070. Here, a case in which the coils 1141b, 1143b, and 1145b for the reflecting module 1100 and the coils 1241b and 1243b for the lens module 1200 are mounted on the main board 1070 is illustrated in the drawings for convenience of explanation, the main board 1070 is not limited to the described configuration, but may be also provided as separate boards on which the coils 1141b, 1143b, and 1145b for the reflecting module 1100 and the coils 1241b and 1243b for the lens module 1200 are mounted, respectively.

When the lens holder 1220 is moved, a closed loop control manner of sensing and feeding back a position of the lens holder 1220 may be used. Therefore, a position sensor 1243c is provided to perform a closed loop control. The position sensor 1243c may be a hall sensor.

The position sensor 1243c may be disposed inside or outside the coil 1243b, and may be mounted on the main board 1070 on which the coil 1243b is mounted.

The lens holder 1220 is disposed in the housing 1010 and is movable in the optical axial direction (the Z-axial direction). As an example, ball members 1250 (see FIGS. 4 and 7) are disposed between the lens holder 1220 and the housing 1010.

The ball members 1250 function as bearings guiding the movement of the lens holder 1220 in an AF process. In addition, the ball members 1250 may also serve to maintain a spacing between the lens holder 1220 and the housing 1010.

The ball members 1250 are rolled in the optical axial direction (the Z-axial direction) when driving force in the optical axial direction (the Z-axial direction) is generated. Therefore, the ball members 1250 guide the movement of the lens holder 1220 in the optical axial direction (the Z-axial direction).

Guide grooves 1221 and 1231 (see FIGS. 7 and 5) in which the ball members 1250 are accommodated are respectively formed in at least one of surfaces of the lens holder 1220 facing the housing 1010 and in at least one surface of the housing 1010.

The ball members 1250 are accommodated in the guide grooves 1221 and 1231 and are fitted between the lens holder 1220 and the housing 1010.

The guide grooves 1221 and 1231 may have a length in the optical axial direction (the Z-axial direction).

The ball members 1250 may be limited from being moved in the first axial direction (the X-axis direction) and the second axial direction (the Y-axis direction) and can be moved in only the optical axial direction (the Z-axial direction), in a state in which they are accommodated in the plurality of guide grooves 1221 and 1231. As an example, the ball members 1250 are rolled in only the optical axial direction (the Z-axial direction).

To this end, a plane shape of each of the guide grooves 1221 and 1231 may be a rectangular shape formed to be elongate in the optical axial direction (the Z-axial direction). In addition, cross sections of the plurality of guide grooves 1221 and 1231 may have various shapes such as a round shape, and a polygonal shape.

The lens holder 1220 is pressed toward the housing 1010 so that the plurality of ball members 1250 are maintained in a state in which they are in contact with the lens holder 1220 and the housing 1010.

Figure 4:
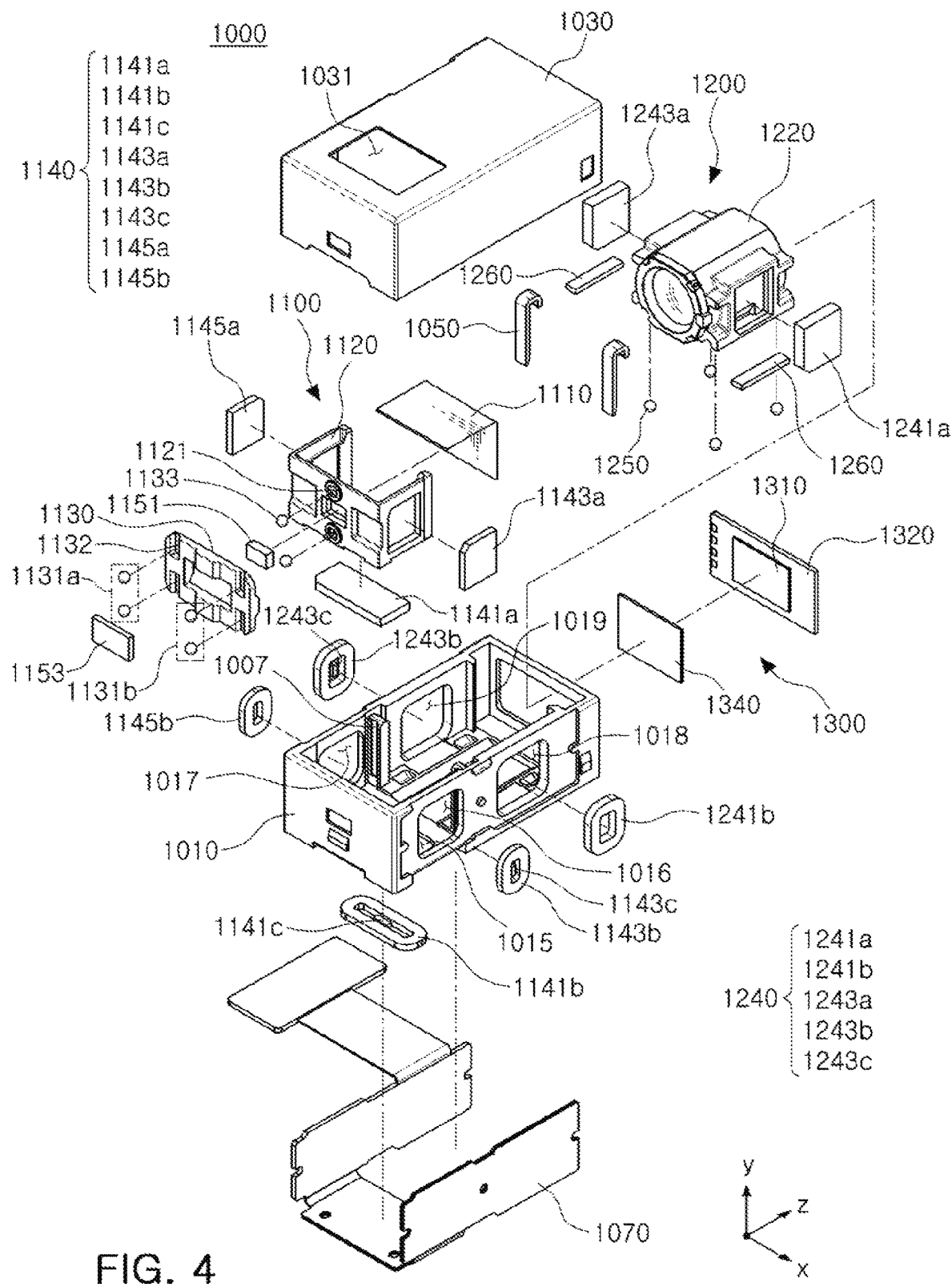
FIG. 4 is an exploded perspective view illustrating the camera module, according to an embodiment.
Figure 5:
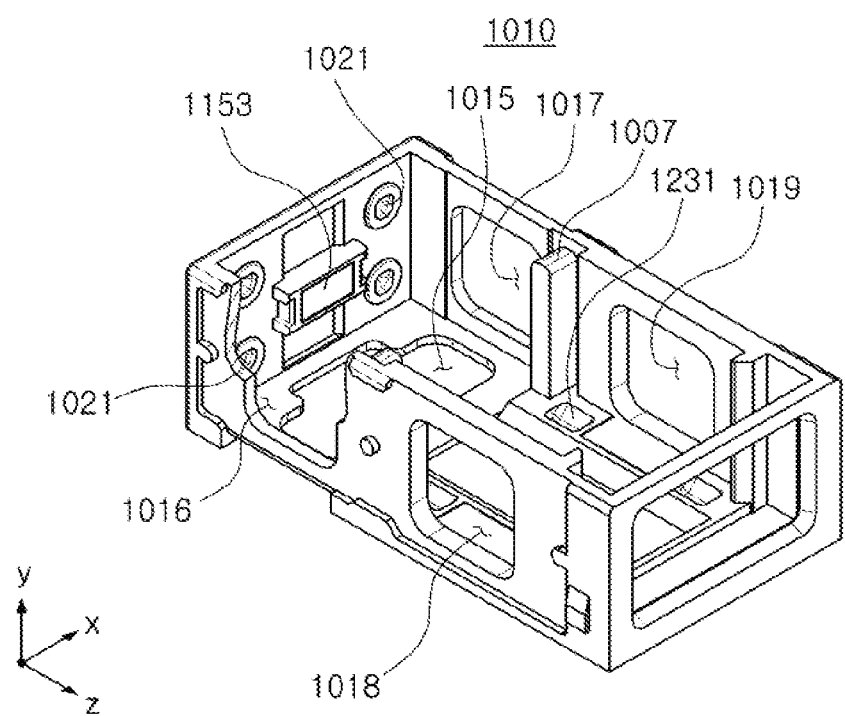
FIG. 5 is a perspective view illustrating a housing of the camera module, according to an embodiment.

To this end, as shown in in FIG. 4, the housing 1010 is provided with yokes 1260 facing the magnets 1241*a* and 1243*a* mounted on the lens holder 1220. The yokes 1260 may be formed of a magnetic material.

Attractive force acts between the yokes 1260 and the magnets 1241*a* and 1243*a*. Therefore, the lens holder 1220 is moved in the optical axial direction (the Z-axial direction) by the driving force of the second driving part 1240 in a state in which the lens holder 1220 is in contact with the ball members 1250.

Figure 13:
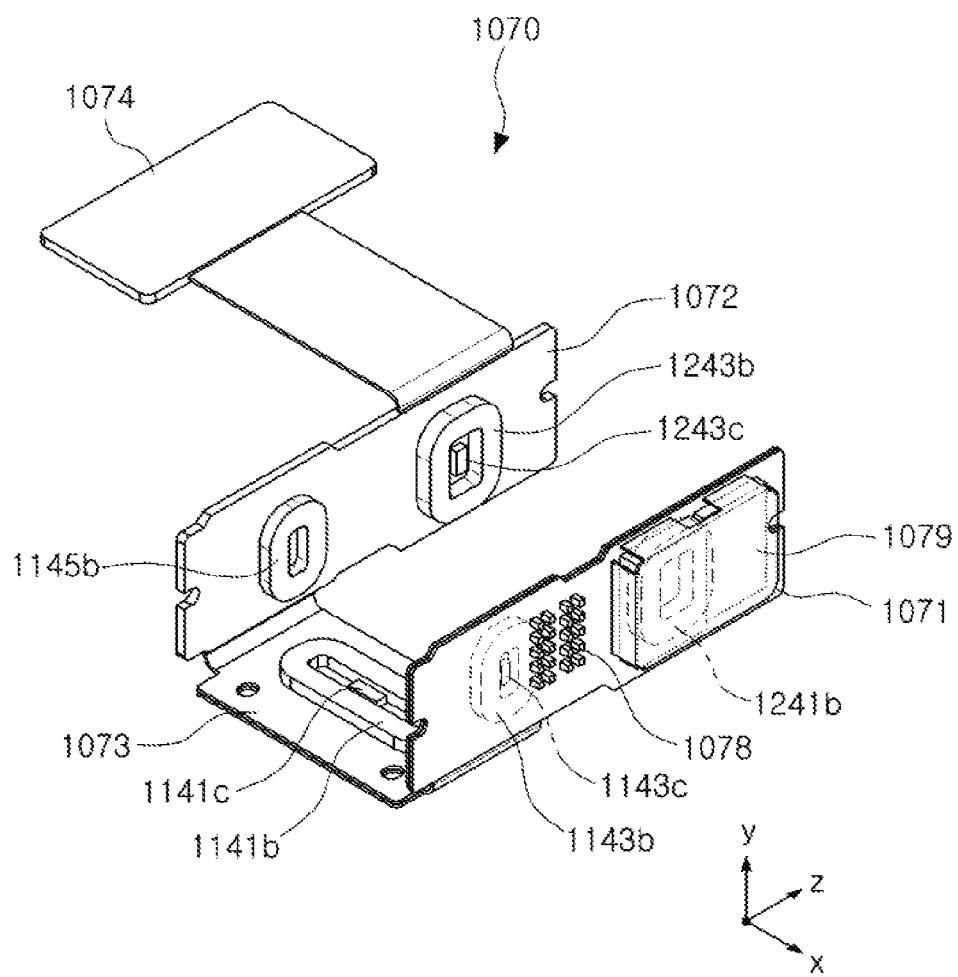
FIG. 13 is a perspective view illustrating a main board, according to an embodiment, and coils and components mounted on the main board.

FIG. 13 is a perspective view illustrating the main board 1170, according to an embodiment, and the coils 1141*b*, 1143*b*, 1145*b*, 1241*b*, and 1243*b* and components 1078 mounted on the main board.

Referring to FIG. 13, the coils 1141*b*, 1143*b*, and 1145*b* of the first driving part 1140 for driving the reflecting module 1100 and the coils 1241*b* and 1243*b* of the second driving part 1240 for driving the lens module 1200 are mounted on an inner surface of the main board 1070. In addition, the components 1078, such as various passive elements and active elements, and a gyro sensor 1079, are mounted on an outer surface of the main board 1070. Therefore, the main board 1070 is a double-sided substrate.

In detail, the main board 1070 includes a first side substrate 1071 and a second side substrate 1072 disposed approximately in parallel with each other, and a bottom substrate 1073 connecting the first side substrate 1071 and the second side substrate 1072 to each other. The main board 1070 further includes a terminal part 1074 for connection of an external power supply and a signal, which can be connected to any one of the first side substrate 1071, the second side substrate 1072, and the bottom substrate 1073.

Some 1143*b* (see FIG. 13) of the coils 1141*b*, 1143*b*, and 1145*b* of the first driving part 1140 for driving the reflecting module 1100, the sensor 1143*c* of the first driving part 1140 for sensing a position of the reflecting module 1100, and some 1241*b* (see FIG. 13) of the coils 1241*b* and 1243*b* of the second driving part 1240 for driving the lens module 1200 are mounted on the first side substrate 1071.

Some 1145*b* (see FIG. 13) of the coils 1141*b*, 1143*b*, and 1145*b* of the first driving part 1140 for driving the reflecting module 1100 and some 1243*b* (see FIG. 13) of the coils 1241*b* and 1243*b* of the second driving part 1240 for driving the lens module 1200 are mounted on the second side substrate 1072.

Some 1141*b* (see FIG. 13) of the coils 1141*b*, 1143*b*, and 1145*b* of the first driving part 1140 for driving the reflecting module 1100 and the sensor 1141*c* of the first driving part 1140 for sensing the position of the reflecting module 1100 are mounted on the bottom substrate 1073.

An embodiment in which the components 1078 such as the various passive elements, active elements, and the gyro sensor 1079 are mounted on the first side substrate 1071 is illustrated in FIG. 13, but the components 1078 may be mounted on the second side substrate 1072 or may be appropriately distributed and mounted on the first side substrate 1071 and the second side substrate 1072.

Figure 14:
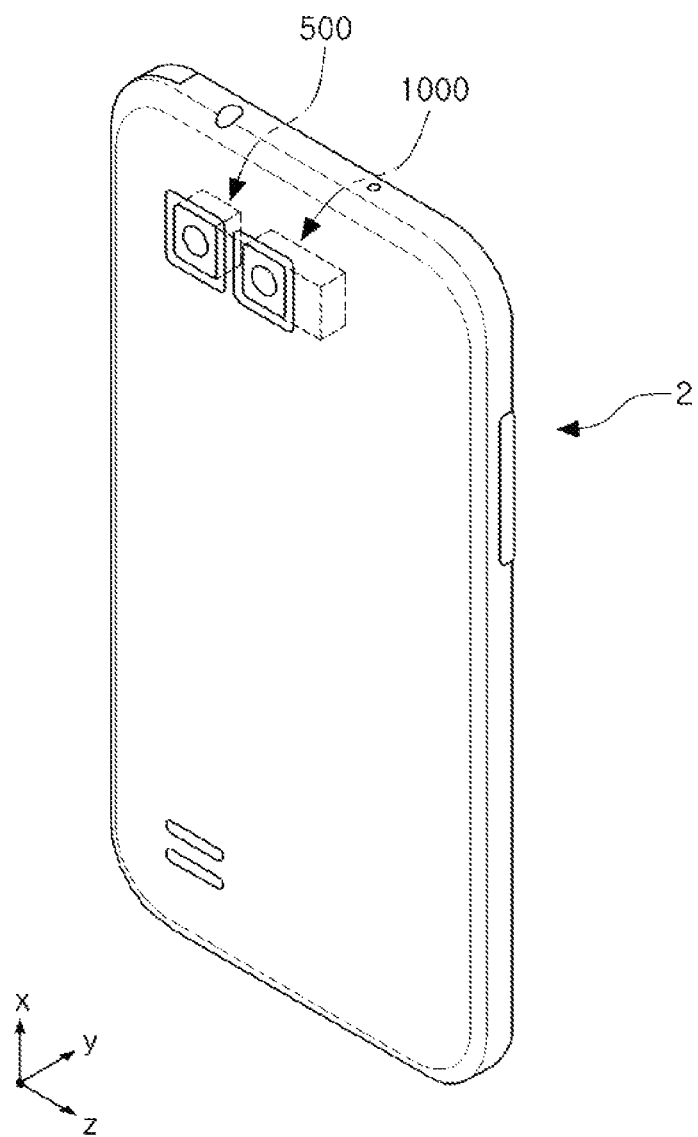
FIG. 14 is a perspective view illustrating a portable electronic device, according to another embodiment.

FIG. 14 is a perspective view illustrating a portable electronic device 2, according to another embodiment.

Referring to FIG. 14, the portable electronic device 2 is a portable electronic device such as a mobile communications terminal, a smartphone, or a tablet personal computer (PC), in which camera modules 500 and 1000 are mounted.

The camera module 500 may be the same as the camera module 1000, which is described with reference to FIGS. 2 through 13. That is, the portable electronic device 2 includes a dual camera module, which may include two camera modules 1000. Alternatively, the camera module 500 may be different than the camera module 1000.

As set forth above, a reflecting module for OIS and a camera module including the reflecting module has a simple structure and a reduced size while implementing an autofocusing function, a zoom function, and an OIS function. In addition, power consumption by the camera module is significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflecting module for optical image stabilization (OIS), comprising:
    a housing comprising an internal space;
    a driving holder comprising a reflecting member and supported by an inner wall of the housing in a state in which a driving plate is fitted between the driving holder and the housing so that the driving holder is provided in the internal space; and
    a driving part configured to provide driving force to the driving holder to move the driving holder,
    wherein the driving plate is linearly movable along one axis approximately perpendicular to an optical axis or is rotatable around the one axis with respect to the housing, and the driving holder is linearly movable along the one axis or is rotatable, with respect to the driving plate, around the one axis.

2. The reflecting module for OIS of claim 1, wherein
    the driving plate is configured to move together with the driving holder, in response to the driving plate being linearly moved along the one axis or rotated around the one axis, and
    the driving holder is configured to move relative to the driving plate, in response to the driving holder being linearly moved along the one axis or rotated around the one axis.

3. The reflecting module for OIS of claim 1, wherein the driving plate comprises one or more first ball bearing sets comprising first ball bearings aligned in one axial direction on a surface of the driving plate facing the housing, and a second ball bearing set comprising second ball bearings aligned in the one axial direction on another surface of the driving plate facing the driving holder.

4. The reflecting module for OIS of claim 3, wherein the one or more first ball bearing sets comprise two first ball bearing sets, and the first ball bearings are aligned in the one axial direction between the driving plate and the housing when the driving plate is linearly moved with respect to the housing.

5. The reflecting module for OIS of claim 3, wherein the second ball bearings comprise two or more second ball bearings, and the two or more second ball bearings are aligned in the one axial direction between the driving holder and the driving plate when the driving holder is rotated with respect to the driving plate.

6. The reflecting module for OIS of claim 5, wherein the two or more second ball bearings are positioned at approximately a center of the driving plate in another axial direction perpendicular to the optical axis and the one axis.

7. The reflecting module for OIS of claim 3, wherein
the first ball bearings are fixed to the driving plate or the housing, or are freely rotatable, and
the second ball bearings are fixed to the driving plate or the driving holder, or are freely rotatable.

8. The reflecting module for OIS of claim 3, wherein the first and second ball bearings comprise a spherical shape or a spherical shape of which a portion is cut.

9. The reflecting module for OIS of claim 3, wherein any one of facing surfaces of the housing and the driving plate comprises seating grooves into which the ball bearings are inserted.

10. The reflecting module for OIS of claim 9, wherein the seating grooves are elongate in a direction in which the ball bearings are aligned.

11. The reflecting module for OIS of claim 9, wherein a cross section of the seating grooves comprises a polygonal shape or a round shape.

12. The reflecting module for OIS of claim 1, wherein the driving plate comprises one or more ball bearings comprising a cylindrical or semi-cylindrical shape that is elongate along another axis perpendicular to the optical axis and the one axis between the driving plate and the housing when the driving plate is linearly moved with respect to the housing.

13. The reflecting module for OIS of claim 1, wherein the driving holder comprises one or more ball bearings comprising a cylindrical or semi-cylindrical shape that is elongate along the one axis between the driving holder and the driving plate when the driving holder is rotated with respect to the driving plate.

14. The reflecting module for OIS of claim 1, further comprising:
a pulling magnet disposed in one of the housing and the driving holder; and
a pulling yoke disposed in the other of the housing and the driving holder,
wherein the driving holder is supported by the inner wall of the housing by attractive force between the pulling magnet and the pulling yoke.

15. A camera module comprising:
a lens module comprising lenses; and
a reflecting module for optical image stabilization (OIS) disposed in front of the lens module and configured to change a path of light incident to the reflecting module to direct the light toward the lens module, the reflecting module comprising
a housing comprising an internal space,
a driving holder comprising a reflecting member and supported by an inner wall of the housing in a state in which a driving plate is fitted between the driving holder and the housing so that the driving holder is provided in the internal space, and
a driving part configured to provide driving force to the driving holder to move the driving holder,
wherein the driving plate is linearly movable along one axis approximately perpendicular to an optical axis or is rotatable around the one axis with respect to the housing, and the driving holder is linearly movable along the one axis or is rotatable, with respect to the driving plate, around the one axis.

16. The camera module of claim 15, wherein
the lens module is disposed in the housing, and
a main board on which coils for driving the lens module and the reflecting module for OIS are mounted is disposed on side surfaces and a bottom surface of the housing.

17. The camera module of claim 16, wherein
the main board comprises a double-sided substrate,
the coils are mounted on an inner surface of the main board toward the internal space of the housing, and
components and a gyro sensor are mounted on an outer surface of the main board opposing the inner surface of the main board.

18. A reflecting module for optical image stabilization (OIS), comprising:
a housing comprising an internal space;
a driving holder comprising a reflecting member and supported by an inner wall of the housing in a state in which a driving plate is fitted between the driving holder and the housing so that the driving holder is provided in the internal space; and
a driving part configured to provide driving force to the driving holder to move the driving holder,
wherein the driving plate is linearly movable along one axis approximately perpendicular to an optical axis, and the driving holder is linearly movable along the one axis and is rotatable, with respect to the driving plate, around the one axis.

* * * * *